UNITED STATES PATENT OFFICE.

ALEXANDER MITSCHERLICH, OF FREIBURG, GERMANY.

PROCESS OF PULVERIZING WOOD.

SPECIFICATION forming part of Letters Patent No. 459,589, dated September 15, 1891.

Application filed September 29, 1890. Serial No. 366,536. (No specimens.)

*To all whom it may concern:*

Be it known that I, ALEXANDER MITSCHERLICH, professor of chemistry and doctor of philosophy, a subject of the King of Prussia, residing at Freiburg, in the Grand Duchy of Baden, German Empire, have invented new and useful Improvements in Converting Wood and Woody Parts of Plants into a Pulverized Mass, of which the following is a specification.

This invention relates to a process of converting wood and woody parts of plants into a pulverized mass which may be used in substitution of mechanically-produced wood pulp or in any other suitable manner. Wood or woody parts of plants, in particular waste wood, are impregnated either in a raw condition or after having been softened and impregnated by any chemical or mechanical means with such liquid, which converts the woody masses hitherto tough into brittle hard substances. This is obtained by impregnating the raw or softened wood with concentrated solutions of salts, which are as cheap as possible, such as sulphate of soda, common salt, and the like, having the property of producing by the evaporation of water brittle bodies, and of converting by this means the woody masses which hitherto were tough and soft into brittle hard bodies. This operation is for the most part repeated several times. The wood is converted by these means from the mass difficult to be transformed into a pulverulent condition into a brittle body easily to be pulverized, and it is capable now of being rubbed, stamped, ground, or crushed with a proportionally small amount of power into a fine powder, so as to form a substance similar to the mechanical wood pulp, and which may be used in place of the latter. The salts are removed by means of lixiviating apparatus in using counter currents, and they are recovered in a solution fit for being used again. The wood-powder, which is impregnated with water, is used in a wet or dry state after the water has partially or entirely been removed.

In the same manner as above described is worked the whole waste resulting from working wood, such as wood-shavings, sawing-chips, waste of cellulose factories, and of establishments producing extracts of colors, tanning principles from wood, and the like; but it is to be noted here that the not-softened woody mass does not absorb a proportionally-large quantity of impregnating-liquid, and that for this reason it is not reduced as easily as the softened mass. By this a process is shown how the waste of any kind of wood may be transformed in the manufacture of wood fibers at small cost into industriously-useful substances.

Having thus described my invention, I claim as new and desire to secure by Letters Patent—

The process of converting wood and woody parts of plants into a pulverized mass, consisting, first, in reducing the woody substances to small pieces; secondly, saturating the said reduced woody substances with a saturated salt solution, such as sulphate of soda, chloride of soda, and the like, pulverizing the wood after drying, and then removing the salts by lixiviation, substantially as set forth.

In testimony whereof I have signed my name to this specification in the presence of two subscribing witnesses.

ALEXANDER MITSCHERLICH.

Witnesses:
    JEAN GRUND,
    FRANK H. MASON.